(12) United States Patent
Stevens et al.

(10) Patent No.: US 7,755,689 B2
(45) Date of Patent: Jul. 13, 2010

(54) IMAGING SYSTEM WITH LOW NOISE PIXEL ARRAY COLUMN BUFFER

(75) Inventors: John C. Stevens, Northridge, CA (US);
Adam O. Lee, Portland, OR (US);
Stefan C. Lauxtermann, Camarillo, CA (US); Atul Joshi, Thousand Oaks, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 455 days.

(21) Appl. No.: 11/973,034

(22) Filed: Oct. 5, 2007

(65) Prior Publication Data
US 2009/0090846 A1 Apr. 9, 2009

(51) Int. Cl.
H04N 3/14 (2006.01)
H04N 5/335 (2006.01)
H01L 31/062 (2006.01)
H01L 31/113 (2006.01)
H01L 27/00 (2006.01)

(52) U.S. Cl. ............... 348/300; 257/291; 250/208.1
(58) Field of Classification Search ......... 348/300–303; 257/223, 249–250
See application file for complete search history.

(56) References Cited

U.S. PATENT DOCUMENTS

| | | | | |
|---|---|---|---|---|
| 6,587,142 B1* | 7/2003 | Kozlowski et al. | ........... | 348/241 |
| 6,697,111 B1* | 2/2004 | Kozlowski et al. | ........... | 348/302 |
| 6,809,767 B1* | 10/2004 | Kozlowski et al. | ........... | 348/308 |
| 6,888,572 B1* | 5/2005 | Kozlowski | ................ | 348/308 |
| 6,965,707 B1* | 11/2005 | Kozlowski | ................ | 382/312 |
| 7,046,284 B2* | 5/2006 | Kozlowski et al. | ........... | 348/308 |
| 7,227,490 B2* | 6/2007 | Kawahito | .................... | 341/156 |
| 7,385,636 B2* | 6/2008 | Xu | ............. | 348/241 |
| 7,518,647 B2* | 4/2009 | Kim et al. | ................ | 348/308 |
| 7,561,199 B2* | 7/2009 | Noda et al. | ............... | 348/308 |
| 7,616,243 B2* | 11/2009 | Kozlowski | ................ | 348/302 |
| 7,649,559 B2* | 1/2010 | Olsen | ............. | 348/300 |
| 2008/0218602 A1* | 9/2008 | Kozlowski | ............. | 348/231.99 |

OTHER PUBLICATIONS

Sobering, T. J. et al.; "Reset Noise in Multiplexed Photodiode Arrays"; Sensors and Electronics Department 9222; Sandia National Laboratories; Mar. 7, 1994; pp. 1-4.

(Continued)

*Primary Examiner*—Kelly L Jerabek
(74) *Attorney, Agent, or Firm*—Koppel, Patrick, Heybl & Dawson

(57) ABSTRACT

An imaging system includes a row and column array of active pixels, each having an associated pitch. In response to respective control signals, each pixel outputs a reset level which includes noise components, or a signal level which includes signal and noise components. Multiple column buffers, each having a pitch equal to or less than that of a pixel, convey the outputs of respective pixel columns to a bus line. Each buffer comprises 'odd' and 'even' S&H/CDS circuits, which process the pixel outputs of odd and even rows, respectively. Each S&H/CDS circuit subtracts pixel reset level from signal level to produce an output in which correlated noise is suppressed. Each column buffer includes a buffer amplifier which conveys the output to the bus line. A gain amplifier separate from the column buffers is coupled to the bus line such that it amplifies the outputs of a multiple column buffers.

15 Claims, 3 Drawing Sheets

OTHER PUBLICATIONS

Mendis, Sunetra K. et al.; "CMOS Active Pixel Image Sensors for Highly Integrated Imaging Systems"; IEEE Journal of Solid-State Circuits, vol. 32, No. 2; Feb. 1997.

Lee, Kwang-Hyun; "A Noise-Suppressed 0.18-μm CMOS Active Pixel Image Sensor With Single-Slope Column-Parallel ADCs Using Dynamic Current Source for Reset Control Loop"; Department of Electrical Engineering and Computer Science; Korea Advanced Institute of Science and Technology (KAIST); Daejeon, Korea; pp. 1-23.

* cited by examiner

IMAGING SYSTEM WITH LOW NOISE PIXEL ARRAY COLUMN BUFFER

BACKGROUND OF THE INVENTION

1. Field of the Invention

This invention relates generally to imaging systems, and more particularly, to pixel array column buffers.

2. Description of the Related Art

Imaging systems typically consist of a row and column array of pixels, the outputs of which are processed to provide an output signal which varies with the light impinging on the array. Each pixel includes a sensor such as a photodiode or charge-coupled device (CCD); if the pixel is "active" it also includes a means for amplifying the sensor's output.

The resolution of an imaging system is determined by the number of pixels located within a given area. To accommodate the desire for ever-higher resolution, pixels are made smaller and smaller. However, this trend towards smaller pixels has led to problems—especially for "active" pixels—which require processing circuitry at each pixel location. For example, some small pixels have a "pitch"—i.e., the width of the pixel—as small as 2 µm. The sensors used for these narrow pixels necessarily produce a very small output signal, which requires considerable processing if noise is to be kept low.

Many techniques have been developed to reduce pixel noise. One method involves correlated-double-sampling (CDS) circuitry, which is described, for example, in "CMOS Active Pixel Image Sensors for Highly Integrated Imaging Systems", S. Mendis et al., IEEE Journal of Solid-state Circuits, Vol. 32, No. 2, February 1997, pp. 187-197. Here, active pixels are periodically reset to a known voltage (Vpixrst). At a predetermined "clamp" time, a CDS circuit stores the difference between a CDS clamp level (Vcds) and the signal level (Vsig) at clamp time (Vcds−Vsig, where Vsig is the output from the pixel at clamp time) on a Ccds capacitor, and adds this voltage to the pixel reset level (Vpixrst) at pixel reset time to produce (Vcds−Vsig)+Vpixrst at the CDS output. This is the difference between the signal and reset level (Vpixrst−Vsig), plus a constant offset (Vcds). This difference voltage between reset and signal levels is used to suppress correlated noise sources and thereby produce a net output signal. The output signal is delivered to gain circuitry which increases the signal's level, so as to raise the noise floor of the signal delivered to the system's output drivers.

However, both the CDS and gain circuitry require a considerable amount of area. Since the available area is typically limited by the pixel pitch, arrays with small pixels may be unable to accommodate these circuits. This is because some circuitry must remain in the column pitch since it cannot be shared from column to column, such as sample/hold and CDS circuits and gain capacitors.

SUMMARY OF THE INVENTION

The present invention provides an imaging system which overcomes the problems noted above, providing low noise pixel readout signals even for arrays having a small pixel pitch.

An imaging system per the present invention includes a row and column array of active pixels, each of which has an associated pitch and is periodically reset to a known state. In response to respective control signals, each pixel is arranged to output a reset level which includes noise components like kTC and 1/f noise, or a signal level which includes both signal and noise components.

The system also includes a plurality of column buffers, each of which conveys the outputs of a respective column of pixels, in turn, to a bus line. Each column buffer comprises 'odd row' and 'even row' sample and hold(S&H)/CDS circuits, which process the pixel outputs of odd and even rows, respectively. Each S&H/CDS circuit is arranged to subtract pixel reset level from pixel signal level to produce a net output signal in which correlated noise components present in the signal level are suppressed. Each column buffer also includes a buffer amplifier arranged to receive the net output signal and convey it to a bus line.

The imaging system also includes one or more gain amplifiers which are separate from and external to the column buffers, each gain amplifier coupled at an input to a respective bus line such that the gain amplifier is shared by a plurality of column buffers.

By including just a small buffer amplifier within each column buffer and moving the gain amplifiers out of the column buffers, the column buffers can be made small enough to have a pitch which is equal to or less than the pitch of the system's pixels, while still providing a low noise readout.

These and other features, aspects, and advantages of the present invention will become better understood with reference to the following drawings, description, and claims.

DETAILED DESCRIPTION OF THE INVENTION

Figure 1:
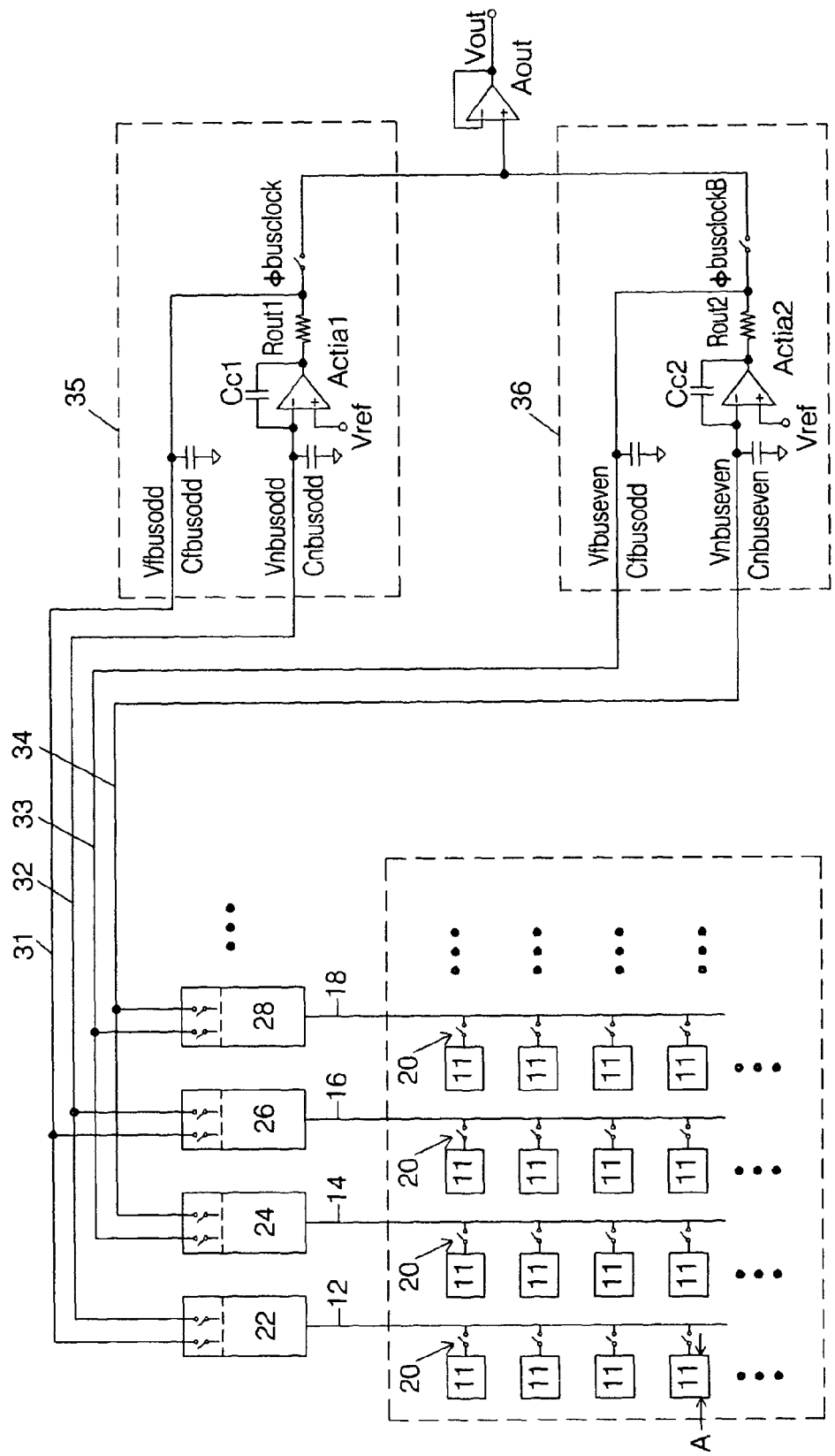
FIG. 1 is a block diagram of an imaging system per the present invention.

A block diagram illustrating the principles of an imaging system per the present invention is shown in FIG. 1. The system includes a row and column array 10 of active pixels 11, each of which produces an output. The outputs of each pixel in a given column are connected to a common column line (12, 14, 16, 18), in turn, via respective switches 20. Each column line is connected to a respective column buffer (22, 24, 26, 28), which processes and amplifies the pixel output to which it is connected.

The outputs of the column buffers are switchably connected to one or more bus lines. In the exemplary system shown in FIG. 1, there are four bus lines: the outputs of the column buffers (22, 26) in the odd numbered columns can be switched onto bus lines 31 and 32, and the outputs of the column buffers (24, 28) in the even numbered columns can be switched onto bus lines 33 and 34. The bus lines are connected to respective gain circuits 35 and 36 which are external to the column buffers, which preferably include respective capacitance transimpedance amplifiers (CTIAs) Actia1 and Actia2, the outputs of which are switchably connected to an amplifier Aout which produces final output Vout.

The active pixels may comprise, for example, CMOS-based charge-coupled devices (CCDs) or photodiodes. Each pixel has an associated pitch 'A', and is periodically reset to a known state. In response to respective control signals (not shown), each pixel is arranged to output a reset level which includes noise components that inherently arise due to the pixel's design, or a signal level which includes both signal and noise components. The noise components typically include kTC or reset noise which arises when the pixel is reset to an initial state, 1/f noise that originates from the source follower circuit found in many pixels, and offset or fixed pattern noise (FPN).

Each column buffer 22, 24, 26, 28 preferably includes 'odd row' and 'even row' S&H/CDS circuits, which are arranged to process the outputs of pixels located in odd and even rows, respectively. Each S&H/CDS circuit is arranged to subtract the pixel reset level from the pixel signal level to produce a net output signal in which correlated noise components present in the signal level are suppressed. Each column buffer also preferably includes a buffer amplifier, which is arranged to receive the net output signal and convey it to one of the bus lines.

Gain circuits 35 and 36 are coupled to respective pairs of bus lines (bus lines 31 and 32 to gain circuit 35 and bus lines 33 and 34 to gain circuit 36) such that each gain circuit amplifies the outputs of multiple of column buffers.

The column buffers are implemented such that they have a pitch which is equal to or less than pixel pitch 'A'. This is made possible by moving gain amplifiers Actia1 and Actia2 out of the column buffers such that each is shared by a number of column buffers, and retaining within the column buffers only that circuitry needed to provide low noise (described below). When so arranged, the area required for the column buffer circuitry is kept to a minimum, thereby enabling each column buffer to be accommodated even in systems having a small pixel pitch, such as 2 µm or less.

Figure 2:
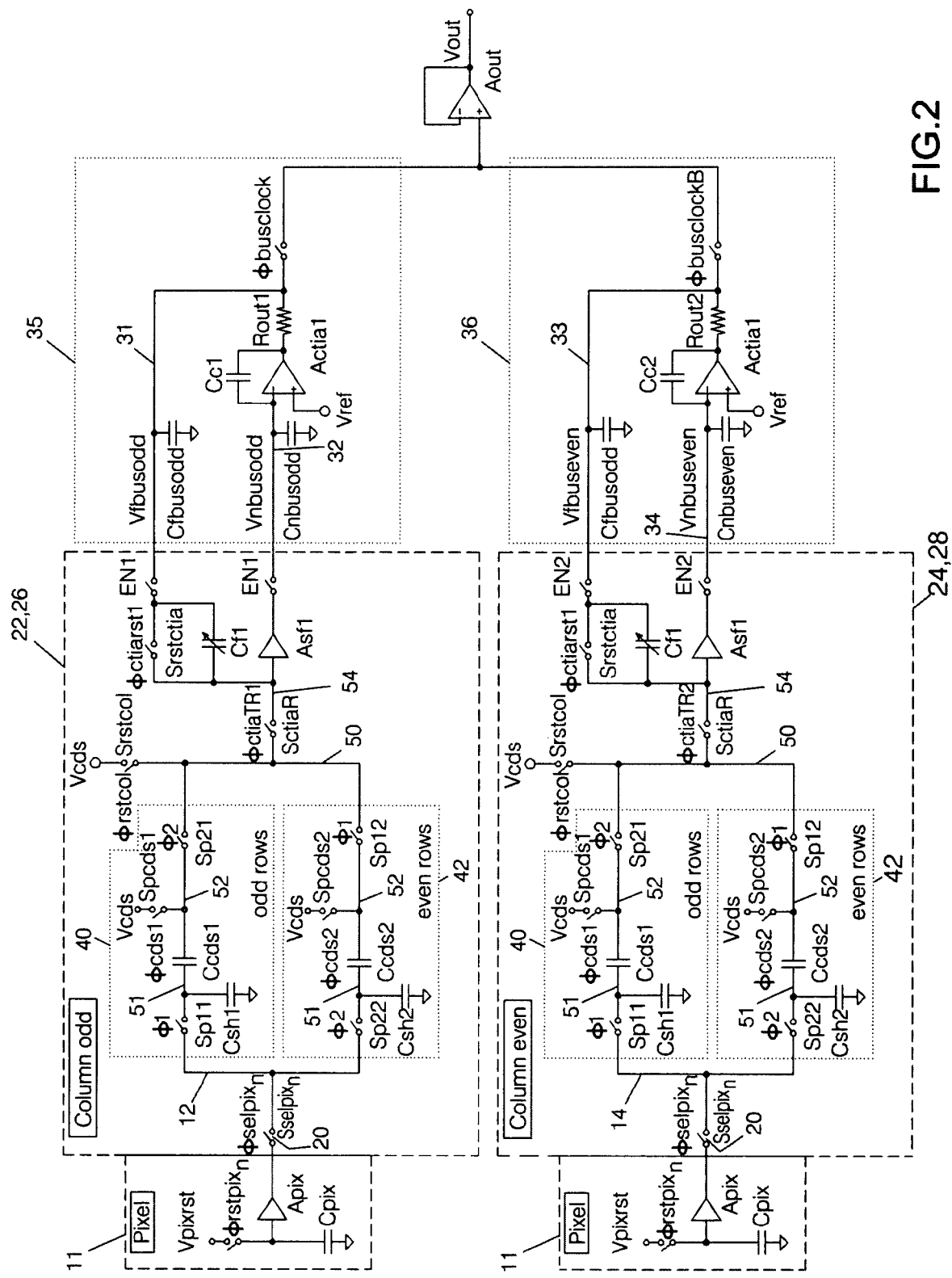
FIG. 2 is a schematic diagram of 'even' and 'odd' column buffers as might be used in an imaging system per the present invention.

A schematic diagram of an 'odd' column buffer (such as 22 or 26) and an 'even' column buffer (such as 24 or 28) per the present invention is shown in FIG. 2. The column buffers contain numerous switches which are operated with respective control signals. The name of each switch's control signal is listed next to the switch; these control signal names correspond with those listed on the timing diagram shown in FIG. 3.

Pixel 11 can be configured in many different ways; here, a pixel is represented as a capacitance Cpix, a source follower circuit Apix, a reset switch controlled by a control signal $\Phi rstpix_n$, where n is the row number. Such a pixel might include, for example, a photodiode, a CCD transfer gate, a reset transistor, and a driver FET, and an access transistor in source follower circuit Apix; these components are not shown for clarity. Each pixel is connected to a column line (e.g., 12, 14) via a respective switch (20).

As noted above, each column buffer preferably includes two S&H/CDS circuits: one (40) arranged to process the pixel outputs of odd rows, and one (42) arranged to process the pixel outputs of even rows. Each circuit 40 comprises capacitors Csh1 and Ccds1 and switches Sp11, Sp21 and Spcds1, which are operated with control signals Φ1, Φ2 and Φcds1, respectively. Each circuit 42 comprises capacitors Csh2 and Ccds2 and switches Sp22, Sp12 and Spcds2, which are operated with control signals Φ2, Φ1 and Φcds2, respectively.

In FIG. 2, circuit 40 is arranged to subtract two voltage levels—a signal voltage (Vsig) and a reset voltage (Vpixrst)—received from the pixel at two different times. In a simple pixel such as that shown in FIG. 2, the signal level occurs first, followed by the reset level.

Each of circuit blocks 40 and 42 alternate "first" and "second" functions for even and odd rows. The "first" function is to read data from the pixel to the column buffer capacitors, and the "second" function is to send stored data from the column buffer capacitors to the output multiplexer, which consists of CTIA amplifiers Actia1 and Actia2, output amplifier Aout, with buffer amplifiers Asf1, feedback capacitors Cf1, even and odd output busses and even and odd feedback busses.

Figure 3:
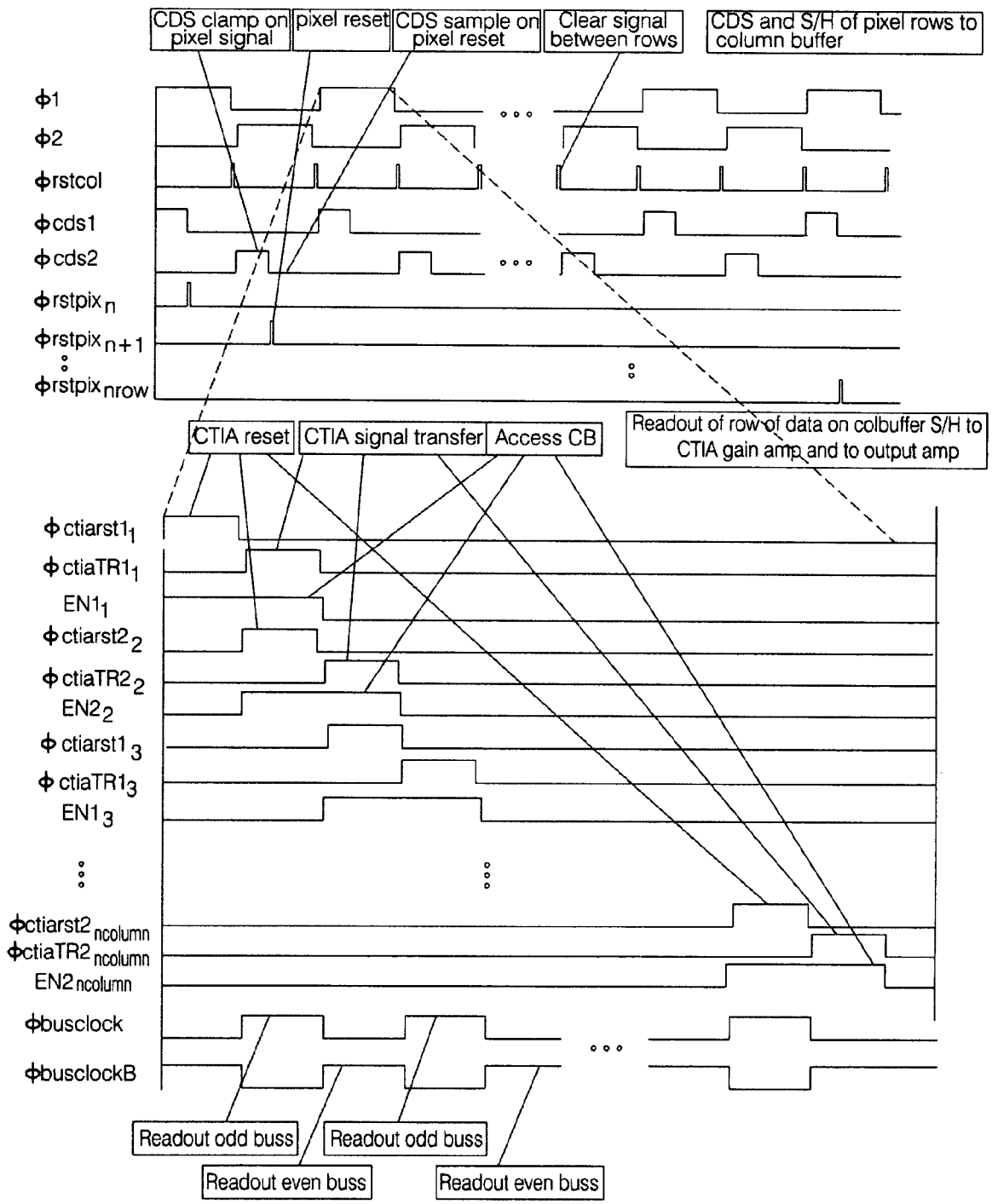
FIG. 3 is a timing diagram for the column buffers shown in FIG. 2.

When performing the first function, the odd rows access the pixels when switches Sp11,Sp12 are on and Sp22,Sp21 are off (clock Φ1 high and Φ2 low, FIG. 3). In the "clamping" phase, the clamp clock (Φcds1) is held high, turning on switch Spcds1 and putting a voltage Vcds on node 52. The pixel signal level Vsig at node 12 forces node 51 to Vsig. Therefore the voltage Vcds-Vsig is held across the CDS capacitor Ccds1. The CDS clamp clock Φcds1 is clocked low, turning off switch Spcds1. The pixel is reset by clocking Φrstpix high and low, turning on and off the pixel reset switch and resetting the pixel to Vpixrst. The pixel reset moves node 12 and 51 to Vpixrst. The output of the CDS circuit (node 52) is now set to: Vcds-Vsig+Vpixrst=Vcds+(Vpixrst-Vsig). Node 52 now stores the pixel reset level (Vpixrst) minus the signal level (Vsig) plus an offset (Vcds). This serves to suppress correlated noise components present in the signal level. The result of the subtraction appears at node 50.

As noted above, each column buffer also preferably includes a buffer amplifier, identified in FIG. 2 as Asf1, which is arranged to receive net output signal 50 via a switch SctiaR and to convey it to one of the bus lines (32, 34), which is in turn coupled to a gain amplifier circuit (35, 36) external to the column buffer.

There is preferably a feedback path (31, 33) between the outputs of the respective gain amplifier circuits and the input (54) to buffer amplifier Asf1, which is preferably provided in the form of a bus line; the buffer amplifier, feedback path and CTIA form a feedback amplifier. A capacitance Cf1 is preferably provided which can be switched into the feedback path. This arrangement has the effect of reducing the capacitance to which the net output signal is subjected, which thereby reduces the circuit's noise gain. For example, assume that the inverting input of gain amplifier Actia1 were connected directly to net output signal 50. The capacitance of the long bus line would typically be relatively high (~6 pF), and would create a large amount of noise during readout of the pixel signal. The noise gain boost is given by the value of the bus capacitance divided by the value of the feedback capacitance Cf1 (~50 fF), which is about 120 in this example. However, if the effective input of Actia1 is moved back to node 54 (via the use of Asf1 and Cf1), much closer to node 50, the capacitance to which net output signal 50 is subjected is much less (~150 fF), resulting in a noise gain boost of about 3. In this way, an imaging system per the present invention is able to, with low noise, extract signal charge, gain it up, and deliver it to an output driver, using a column buffer that consumes an area small enough to enable it to fit within the pixel pitch.

The voltage gain of the circuit arrangement shown in FIG. 2 is also affected by the size of Cf1. It can be shown that the final output voltage Vout is given by: Vout=$-(C_{sh}/Cf1)*(V_{sh}-V_{ref})+V_{ref}$, where $C_{sh}$ is the parallel combination of Csh1 and Ccds1, and $V_{sh}$ is the voltage of the net output signal at node 50.

For stability and to improve settling, there are preferably capacitors (Cc1, Cc2) connected between the output and inverting input of Actia1 and Actia2, respectively.

A timing diagram which illustrates the operation of the even and odd column buffers of FIG. 2 is shown in FIG. 3. As noted above, each column buffer includes 'odd row' and 'even row' S&H/CDS circuits. These circuits operate in parallel: the 'even row' circuit performs S&H/CDS on signal data from even pixel rows while the 'odd row' circuit is reading the previous odd row data out to the output amplifier (Aout). Similarly, the 'odd row' circuit performs S&H/CDS on signal data from odd pixel rows while the 'even row' circuit is reading the previous even row data out to the output amplifier.

Thus, control signals Φ1 and Φ2 control access to the pixel array and to the output multiplexer: when Φ1 is on (logic 'high' in this exemplary embodiment), S&H/CDS is performed on signals from odd pixel array rows and even rows are muxed to the output; the opposite happens when Φ2 is on.

The upper set of traces in FIG. 3 depict the transfer of the data (signal minus reset) from the pixels to the column buffers, and the lower set of traces depict the transfer of data (signal minus reset) from the column buffers serially to the output. These are two parallel and independent operations, and since they are independent the upper and lower traces do not interact with each other.

The transfer of the column buffer signals to the output is done serially, with n-rows of data transferring to one output with n-clocks in a row time at a much faster rate than the pixel to column buffer transfer. The lower traces occur on the different time scale—i.e., at a much faster rate—than the upper traces.

Clocks Φ1 and Φ2 control the access for the two parallel operations. Referring back to FIG. 2, when Φ1 is on and Φ2 is off, the odd column capacitors (Csh1 and Ccds1) are connected to the pixel array and the even column capacitors (Csh2 and Ccds2) are connected to the CTIA amplifiers and the output. When Φ1 is on, the pixel data is transferred to odd column capacitors and the data from the even column capacitors is transferred to the output which was transferred from the previous rows of pixels. When Φ1 is off and Φ2 is on, pixel data is transferred to even column capacitors and odd column capacitor data is transferred to the output.

All the pixels in the same row are selected at once, reset at once, and read out at once. The pixels are selected, reset and read out in sequence, one row at a time. Control signal Φrstcol resets the signal charge on node 50, which contains signal charge from the previous row and would otherwise create crosstalk mixing data between rows. The reset is done on all net output signals on all column buffers at once, between row readouts. The use of even column buffers (24, 28) and odd column buffers (22, 26) enables the even and odd columns of the array to be divided so that their pixel outputs can be multiplexed. The even and odd column buffers act at the same time, on even and odd columns of pixels, one row at the time.

The subscripts on control signals $\Phi rstpix_n$, $\Phi rstpix_{n+1}$, ..., $\Phi rstpix_{n+8}$ refer to the resetting and read out of the pixel rows in an even-odd-even-odd-etc. sequence.

The subscripts on control signals:

$\Phi ctiarst1_n$, $\Phi ctiarst1_{n+1}$, ..., $\Phi ctiarst1_{n+3}$,
$\Phi ctiarst2_n$, $\Phi ctiarst2_{n+1}$, ..., $\Phi ctiarst2_{n+3}$,
$\Phi ctiaTR1_n$, $\Phi ctiaTR1_{n+1}$, ..., $\Phi ctiaTR1_{n+3}$, and
$\Phi ctiaTR2_n$, $\Phi ctiaTR2_{n+1}$, ..., $\Phi ctiaTR2_{n+3}$, refer to the read out of the pixel rows in an even-odd-even-odd-etc. sequence. Note that the odd column buffers (22,26) employ the Φctiarst1 and ΦctiaTR1 control signals, while the even column buffers (24, 28) employ the Φctiarst2 and ΦctiaTR2 control signals. Thus, on odd bus cycles the odd column data is read out to the mux, and on even bus cycles the even column data is readout to the mux.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. An imaging system, comprising:
   at least one bus line;
   a row and column array of active pixels, each of which has an associated pitch and is periodically reset to a known state, said pixel producing a reset level which includes noise components, and a signal level which includes signal and noise components, in response to respective control signals;
   a plurality of column buffers, each of which conveys the outputs of a respective column of pixels, in turn, to one of said at least one bus lines, each of said column buffers comprising:
   'odd row' and 'even row' sample and hold(S&H)/correlated double sampling (CDS) circuits which are switchably connected to said pixels and arranged to process the pixel outputs of odd and even rows, respectively, each S&H/CDS circuit further arranged to subtract the reset level from the signal level of the pixel to which it is connected to suppress correlated noise components present in said signal level and produce a net output signal; and
   a buffer amplifier arranged to receive said net output signal and convey it to one of said at least one bus lines,
   each of said column buffers having a pitch which is equal to or less than said pixel pitch;
   each of said bus lines conveying the outputs of a plurality of said buffer amplifiers; and
   at least one gain amplifier external to said column buffer, said at least one gain amplifier coupled at an input to a respective one of said bus lines such that said gain amplifier amplifies the outputs of a plurality of column buffers.

2. The imaging system of claim 1, wherein said at least one gain amplifier external to said column buffer is a capacitance transimpedance amplifier (CTIA).

3. The imaging system of claim 2, wherein said at least one bus line comprises a first bus line which conveys the outputs of the buffer amplifiers in the column buffers located in the system's 'odd' columns and a second bus line which conveys the outputs of the buffer amplifiers in the column buffers located in the system's 'even' columns, and wherein said at least one gain amplifier comprises first and second gain amplifiers coupled at respective inputs to said first and second bus lines, respectively.

4. The imaging system of claim 1, wherein said pixel pitch is less than or equal to 2 μm.

5. The imaging system of claim 1, wherein said noise components include kTC, 1/f and fixed pattern noise.

6. The imaging system of claim 1, wherein each of said pixels includes a photodiode and a source follower circuit, said source follower circuit coupled at an input to said photodiode output and producing said pixel's output.

7. The imaging system of claim 1, said system further arranged to provide a feedback path between the output of said gain amplifier and the input to each column buffer's buffer amplifier when the output of said column buffer's buffer amplifier is coupled to said gain amplifier, such that said buffer amplifier reduces the magnitude of the bus capacitance to which said column buffer's net output signal is subjected compared with the magnitude of the bus capacitance that said net output signal would be subjected if connected directly to said gain amplifier.

8. The imaging system of claim 7, further comprising a capacitance which can be switchably connected into said feedback path such that the voltage gain realized by said buffer and gain amplifier varies with the size of said capacitance.

9. The imaging system of claim 7, further comprising a capacitance which can be switchably connected into said feedback path such that the noise gain realized by said buffer and gain amplifier varies with the size of said capacitance.

10. The imaging system of claim 1, further comprising an output amplifier which is driven by the outputs of said gain amplifiers.

11. The imaging system of claim 1, further comprising a feedback capacitor connected between the output of said gain amplifier and the input of said gain amplifier which is coupled to a respective one of said bus lines such that the stability of said gain amplifier is improved.

12. An imaging system, comprising:
at least one bus line;
a row and column array of active pixels, each of which has an associated pitch and is periodically reset to a known state, said pixel producing a reset level which includes noise components, and a signal level which includes signal and noise components, in response to respective control signals;
a plurality of column buffers, each of which conveys the outputs of a respective column of pixels, in turn, to one of said at least one bus lines, each of said column buffers comprising:
'odd row' and 'even row' sample and hold(S&H)/correlated double sampling (CDS) circuits which are switchably connected to said pixels and arranged to process the pixel outputs of odd and even rows, respectively, each S&H/CDS circuit further arranged to subtract the reset level from the signal level of the pixel to which it is connected to suppress correlated noise components present in said signal level and produce a net output signal; and
a buffer amplifier arranged to receive said net output signal and convey it one of said at least one bus lines, each of said column buffers having a pitch which is equal to or less than said pixel pitch;
each of said bus lines conveying the outputs of a plurality of said buffer amplifiers;
at least one capacitance transimpedance amplifier (CTIA) external to said column buffer, said at least one CTIA coupled at an input to a respective one of said bus lines such that said CTIA amplifies the outputs of a plurality of column buffers, said system arranged to provide a feedback path between the output of said CTIA and the input to each column buffer's buffer amplifier when the output of said column buffer's buffer amplifier is coupled to said CTIA; and
a capacitance which can be switchably connected into said feedback path, said buffer amplifier, CTIA and feedback path forming a feedback amplifier, the voltage and noise gain realized by said feedback amplifier varying with the size of said capacitance;
such that said buffer amplifier reduces the magnitude of the bus capacitance to which said column buffer's net output signal is subjected compared with the magnitude of the bus capacitance that said net output signal would be subjected if connected directly to said CTIA.

13. The imaging system of claim 12, wherein said at least one bus line comprises a first bus line which conveys the outputs of the buffer amplifiers in the column buffers located in the system's 'odd' columns and a second bus line which conveys the outputs of the buffer amplifiers in the column buffers located in the systems 'even' columns, and wherein said at least one CTIA comprises first and second CTIAs coupled at respective inputs to said first and second bus lines, respectively.

14. The imaging system of claim 12, wherein said pixel pitch is less than or equal to 2 µm.

15. The imaging system of claim 12, wherein said noise components include kTC, 1/f and fixed pattern noise.

* * * * *